Figure 1:
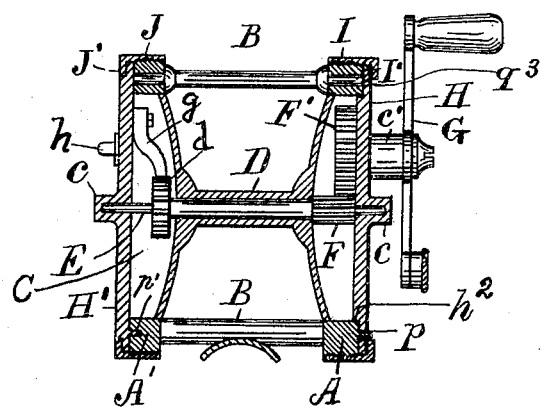

No. 792,910. PATENTED JUNE 20, 1905.
W. MEISSELBACH, Jr. & A. F. MEISSELBACH.
FISHING REEL WITH ADJUSTABLE END PLATES.
APPLICATION FILED JUNE 12, 1903.

3 SHEETS—SHEET 1.

Attest:
George Seligmann.
Arthur F. Heaton

Inventors,
A. F. Meisselbach
W. Meisselbach, Jr.,
per Thomas S. Crane Atty.

No. 792,910. PATENTED JUNE 20, 1905.
W. MEISSELBACH, Jr. & A. F. MEISSELBACH.
FISHING REEL WITH ADJUSTABLE END PLATES.
APPLICATION FILED JUNE 12, 1903.

3 SHEETS—SHEET 2.

Attest:
M. C. Wall
E. W. Crane

Inventors.
A. F. Meisselbach.
W. Meisselbach, Jr.
per Thomas L. Crane, Atty.

No. 792,910. PATENTED JUNE 20, 1905.
W. MEISSELBACH, Jr. & A. F. MEISSELBACH.
FISHING REEL WITH ADJUSTABLE END PLATES.
APPLICATION FILED JUNE 12, 1903.

3 SHEETS—SHEET 3.

No. 792,910. Patented June 20, 1905.

UNITED STATES PATENT OFFICE.

WILLIAM MEISSELBACH, JR., AND AUGUST F. MEISSELBACH, OF NEWARK, NEW JERSEY.

FISHING-REEL WITH ADJUSTABLE END PLATES.

SPECIFICATION forming part of Letters Patent No. 792,910, dated June 20, 1905.

Application filed June 12, 1903. Serial No. 161,233.

*To all whom it may concern:*

Be it known that we, WILLIAM MEISSELBACH, Jr., and AUGUST F. MEISSELBACH, citizens of the United States, and residents of 16 Prospect street, Newark, Essex county, New Jersey, have invented certain new and useful Improvements in Fishing-Reels with Adjustable End Plates, fully described and represented in the following specification and the accompanying drawings, forming a part of the same.

This invention relates to the class of fishing-reels shown in our application, Serial No. 103,121, filed April 16, 1902, in which the reel-frame is provided with an adjustable end plate (called a "head-plate" herein) carrying the hand-crank, by which the axis of the crank may be adjusted in various positions upon the reel-frame.

It is common to use the same reel for different kinds of fishing which require different manipulation of the line, and experience has shown that it is convenient in most cases to place the axis of the hand-crank directly below the axis of the spool.

It has long been known that when the line is running out rapidly and the operator is holding his thumb upon the line to control the movement of the same the hand-crank if thus placed often collides with the fingers of the operator in the rotations caused by the moving line. For this reason we devised the reel shown in our Patent No. 746,544, granted December 8, 1903, for fishing-reel with adjustable head, by which the head-plate H, which carries the hand-crank, could be rotated upon the reel-frame and the bearing of the hand-crank moved farther from the butt of the pole when the operator desired.

In our former application we showed a head-plate secured upon the end of the reel-frame by a screw-threaded band or collar fitted to a corresponding thread upon the end of the reel-frame and having a flange to press the plate tightly upon the end of the frame. Such threaded band or collar may be the sole means of holding the head-plate from turning, or special means may be used for locking the head-plate in various adjusted positions upon the end of the reel-frame before clamping it thereto, so as to positively prevent the shifting of the head-plate and hand-crank from their adjusted position.

Figure 2:
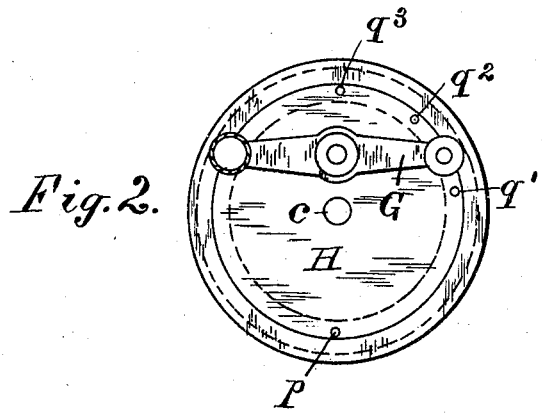
Figure 3:
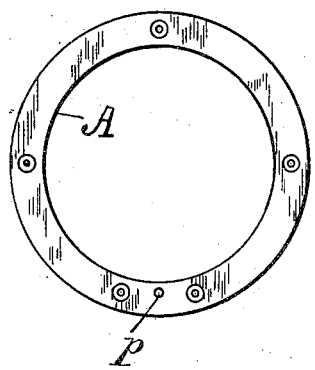
Figure 4:
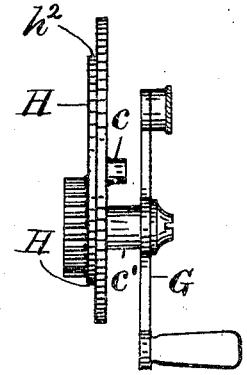
Figure 5:
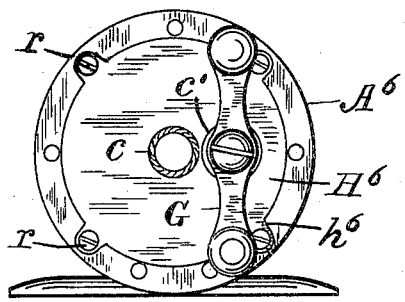
Figure 6:
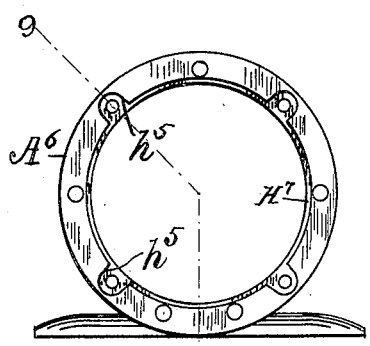
Figure 7:
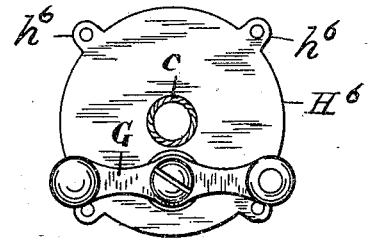
Figure 8:
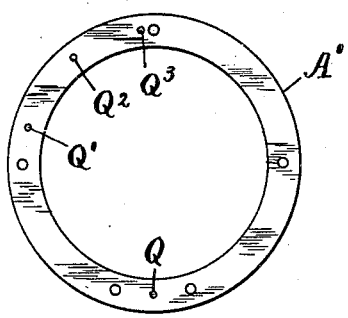
Figure 9:
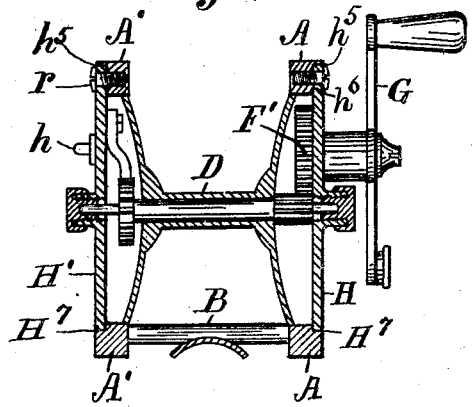

Figure 1 of the drawings is a vertical section where hatched on the center line of Fig. 2, certain parts at the center line being shaded where they are not shown in section. Fig. 2 is an end view of the same construction, the end of the reel-frame and the head-plate in these views being provided with a locking-pin and a series of holes to set the head-plate in various adjustments. The axis of the hand-crank in these figures is shown above the spool-bearing. Fig. 3 is an elevation of the ring A, forming the end of the same reel-frame, with the locking-pin upon the lower part of said ring. Fig. 4 is an edge view of the head-plate detached from the reel-frame with the axis of the hand-crank below the spool-bearing. Figs. 5, 6, and 7 show an alternative construction in which the head-plate is formed with equidistant lugs upon its periphery, and the end of the reel-frame is formed with a series of notches in which such lugs fit interchangeably. Fig. 5 shows an end view of the reel with the axis of the hand-crank at one side of the spool-bearing. Fig. 6 shows the end of the reel-frame with the notches or recesses for receiving the lugs of the head-plate, and Fig. 7 is an elevation of the head-plate with the axis of the handle below the spool-bearing. Fig. 8 shows the outside of the ring A' with a series of holes Q to $Q^3$, inclusive, to fit the pin $p'$ upon the head-plate H'. Fig. 9 is a section on line 9 9 in Fig. 6, showing the annular contact of each head-plate with the end ring by fitting within an annular recess upon such ring.

In Figs. 1 to 4 the same letters are applied to corresponding parts which are used in our Patent No. 746,544, granted December 8, 1903, for fishing-reel with adjustable head. The spool D has spindle E fitted to spool-bearings $c$ upon the head-plates H H'. The reel-frame shown in these figures consists of two heads A A', connected securely together by tie-bars B. The rings A A' form heads upon the reel, which carry the separate head-plates. The head-plates H H' are fitted to the outer sides of the heads A A' and clamped thereon by flanged screw-bands I J. The recess within the head A' is utilized to receive the click mechanism $d\ g$, and the recess within the head A contains the gears F F', which are actuated by the hand-crank G. The shaft of the hand-crank has a bearing $c'$ upon the head-plate H. The heads A A' are shown threaded upon their periphery, and the bands I J are shown threaded internally to fit upon the same and provided, respectively, with the flanges I' and J', which engage the outer sides of the head-plates H H' and operated when the bands are screwed up firmly upon the heads A A' to hold the head-plates immovably.

In Figs. 1 to 4 means is provided for adjusting and locking the head-plate H positively in several predetermined positions, such means consisting of the locking-pin $p$, which is shown upon the lower part of the head A in Figs. 1, 2, and 3, and a series of holes or notches $q\ q'\ q^2\ q^3$. (Shown in Figs. 1 and 2 upon the head-plate H.) When the hole at one end of the series is applied to the locking-pin, as shown in Figs. 1 and 2, it adjusts the bearing of the hand-crank above the spool-bearing, and when the hole $q'$ is applied to the locking-pin it turns the head-plate ninety degrees to adjust the bearing of the hand-crank at the right-hand or farther side of the spool-bearing. The hole $q^3$ is shown in Fig. 2 set opposite the pin $p$ upon the head to adjust the bearing of the hand-crank beneath the spool-bearing. The hole $q^2$, between the holes $q'$ and $q^3$, serves to set the bearing of the hand-crank intermediate to the lowest position and that at the side of the spool-bearing.

The arrangement of the holes or notches may obviously be varied so as to adjust the hand-crank in any convenient or required position. The locking-pin and the holes or notches fitted to the same serve as a means connected with the hand-crank and engaging in the reel-frame to permit of adjusting the position of the hand-crank.

It is obviously immaterial whether the locking-pin be upon the reel-frame or upon the head-plate H if the holes or notches be provided upon the opposed part to engage such locking-pin and lock the head-plate in the various adjustments desired. The head-plate H' in Fig. 1 shows the alternative construction, with the locking-pin $p'$ projected from the head-plate into a hole or notch in the end of the reel-frame. A series of such holes (marked Q, Q', Q², and Q³) is shown upon the head A' in Fig. 8, and the pin $p'$ upon the head H' may be fitted to any of such holes for moving the stud H in different positions. The head-plate which carries a bearing for one end of the spool serves in either case as an adjustable means engaging one end of the frame and carrying operating mechanism for the spool, so that the operating mechanism (including the hand-crank) may be set in various relations to the fishpole or reel-frame as may be desired by the operator.

Figs. 5, 6, 7, and 9 show means for effecting precisely the same result, the end of the reel-frame $A^6$ being notched upon the outer side with equidistant recesses or seats $h^5$, and the plate $H^6$ having lugs $h^6$ fitted interchangeably to such seats and secured therein, when adjusted, by means of screws $r$. The screws permit the detachment and readjustment of the head-plate when desired.

It will be observed in Fig. 6 that the end of the reel-frame $A^6$ is furnished with an annular groove or depression at the inner ends of the recesses $h^5$, which annular groove is adapted to fit the edge of the plate $H^6$, (shown in Fig. 7,) and thus serves to center the plate upon the frame. As the groove is circular and the plate is circular, they fit one another when the plate is turned in different positions and operate to center the plate in whichever position the bearing of the hand-crank G may be adjusted. The annular groove to fit the edge of the head-plate is shown in Fig. 6 of the same depth as the recesses $h^5$.

In Fig. 5 the plate $H^6$ is shown adjusted with the bearing of the hand-crank at one side of the spool-bearing $c$, while Fig. 7 shows the head-plate turned ninety degrees to bring the hand-crank bearing below the spool-bearing. The head-plate, being provided with four of the lugs $h^6$, is adjustable in four positions ninety degrees apart; but any desired number of the lugs may be used with equidistant corresponding recesses $h^5$ in the end of the reel-frame to permit of adjusting the hand-crank in any desired position.

Fig. 1 shows head-plates adjustable upon both ends of the reel-frame, each carrying a center bearing for one end of the spool, and a stud $h$ is shown upon the head-plate H' for applying the click mechanism, the adjustability of the head-plate H' enabling the operator to move the head to hold the stud $h$ in the position most convenient for the operator.

The adjustable head may be centered upon the end of the reel-frame by fitting snugly within the screw-band I or J or by a hub or annular shoulder on the head-plate fitted inside the ring forming the end of the reel-frame. Such a shoulder is shown on the head-plate H in Figs. 1 and 4 at $h^2$, the same operating also to strengthen the ring A by reinforcing it internally.

The head-plates $H^6$ (shown in Figs. 5, 7, and 9) are centered by the annular contact of their edges with the periphery of an annular recess $H^7$, shown upon the inner corner of the head $A^6$ in Fig. 6.

As either construction is efficient, we have claimed broadly any head-plate having an annular contact with the inner side of the head.

The construction of the reel-frame in one or more pieces is immaterial to the present invention, and the reel-frame may be made with separate rings and tie-bars or otherwise, provided the heads or ends of the reel-frame are constructed and combined with the adjustable head-plate or head-plates in the manner described. This will be obvious from the terms of the claims, which are equally applicable to a reel-frame made in separate parts or made in a single piece, as such latter construction is equally well known in the art.

Having thus set forth the nature of the invention, what is claimed herein is—

1. In a fishing-reel, a reel-frame, adjustable end plates engaged therein and suitably engaging therewith to prevent movement when adjusted, a spool, the axle thereof engaging in the said plates and means for operating said spool.

2. In a fishing-reel, a reel-frame, a handle-carrying plate fitted upon one end of said reel-frame, means for fastening the said plate upon the said frame, and locking means provided upon the frame and handle-carrying plate independent of such fastening means, to engage the said handle-carrying plate with the frame and prevent its rotation thereon.

3. A fishing-reel having tie-bars and heads, a rotatable head-plate fitted to the inside of one of the heads, and having annular contact therewith to center said head-plate upon the head, and means for clamping the head-plate to the head.

4. A fishing-reel frame having screw-threads upon its periphery at opposite ends, head-plates fitted detachably to such ends, and screw-collars fitted to said threads and having each a flange fitted to the head-plate for clamping the head-plate upon the frame.

5. A fishing-reel comprising two rings permanently connected together, plates seated in said rings, and means mounted in the outer face of said rings for coupling the plates therewith, substantially as described.

6. A fishing-reel comprising a reel-frame, a removable head-plate for the front end of said frame, a removable head-plate for the rear end of said frame, and means for securing the plates to the ends of the frame.

In testimony whereof we have hereunto set our hands in the presence of two subscribing witnesses.

WILLIAM MEISSELBACH, JR.
AUGUST F. MEISSELBACH.

Witnesses:
WILLIAM FRIEDEL,
THOMAS S. CRANE.